United States Patent
Shoko et al.

(10) Patent No.: US 8,932,714 B2
(45) Date of Patent: Jan. 13, 2015

(54) METHOD AND APPARATUS FOR CONTROLLING PARTICLE DIAMETER AND PARTICLE DIAMETER DISTRIBUTION OF EMULSION PARTICLES IN EMULSION

(75) Inventors: Toshikatsu Shoko, Yokohama (JP); Shozo Hayashi, Yokohama (JP); Yasuo Togami, Yokohama (JP); Akira Takagi, Yokohama (JP); Hideko Hayashi, legal representative, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 215 days.

(21) Appl. No.: 12/681,484

(22) PCT Filed: Oct. 1, 2008

(86) PCT No.: PCT/JP2008/068257
§ 371 (c)(1),
(2), (4) Date: May 21, 2010

(87) PCT Pub. No.: WO2009/044926
PCT Pub. Date: Apr. 9, 2009

(65) Prior Publication Data
US 2011/0135933 A1    Jun. 9, 2011

(30) Foreign Application Priority Data
Oct. 5, 2007    (JP) .................................. 2007-262213

(51) Int. Cl.
*A61K 9/14*    (2006.01)
*C08F 120/18*    (2006.01)
*B32B 1/00*    (2006.01)
(Continued)

(52) U.S. Cl.
CPC ................ *C08F 2/22* (2013.01); *B01F 3/0807* (2013.01); *B01F 5/0682* (2013.01); *B01F 5/0693* (2013.01); *B01F 13/1013* (2013.01); *B01F 13/1016* (2013.01); *B01J 13/16* (2013.01)
USPC ..... 428/402.2; 427/331; 427/212; 427/213.3; 427/482; 264/4.6; 264/4.33; 264/172.11

(58) Field of Classification Search
USPC ...................................... 428/402.2
See application file for complete search history.

(56) References Cited

U.S. PATENT DOCUMENTS
4,869,849 A    9/1989    Hirose et al.
5,554,323 A    9/1996    Tsukimi et al.
(Continued)

FOREIGN PATENT DOCUMENTS
JP    57-007237    1/1982
JP    63-107736    5/1988
(Continued)

*Primary Examiner* — James J Seidleck
*Assistant Examiner* — S. Camilla Pourbohloul
(74) *Attorney, Agent, or Firm* — Preti Flaherty Beliveau & Pachios LLP

(57) ABSTRACT

A method for controlling a particle diameter and a particle diameter distribution of emulsion particles during manufacturing of an emulsion dispersion is provided. The method includes causing two or more types of liquids substantially immiscible with each other to continuously and sequentially pass through net bodies. The net bodies are disposed in a cylindrical flow passage at intervals of 5 to 200 mm, and the number of the net bodies is more than 50 and 200 or less. Each of the net bodies is equivalent to a gauze having a mesh number of 35 mesh to 4000 mesh in accordance with an ASTM standard and has a surface that intersects the direction of the flow passage. An emulsification apparatus used for the method includes a feed pump for feeding two or more types of liquids substantially immiscible with each other; and a cylindrical flow passage to which the two or more types of liquids fed by the feed pump are delivered. A predetermined number of net bodies are disposed in the cylindrical flow passage at predetermined intervals, and each net body has a surface intersecting the direction of the flow passage.

7 Claims, 4 Drawing Sheets

(51) Int. Cl.
  *C08F 2/22* (2006.01)
  *B01F 3/08* (2006.01)
  *B01F 5/06* (2006.01)
  *B01F 13/10* (2006.01)
  *B01J 13/16* (2006.01)

(56) References Cited

U.S. PATENT DOCUMENTS

| 5,785,423 | A | 7/1998 | Chikami |
| 6,379,035 | B1 | 4/2002 | Kubo et al. |
| 2002/0060950 | A1 | 5/2002 | Furukawa |

FOREIGN PATENT DOCUMENTS

| JP | 02-261525 | 10/1990 |
| JP | 05-049912 | 3/1993 |
| JP | 05-212270 | 8/1993 |
| JP | 6-142492 | 5/1994 |
| JP | 06-292633 | 10/1994 |
| JP | 9-29091 | 2/1997 |
| JP | 09-201521 | 8/1997 |
| JP | 2000-254469 | 9/2000 |
| JP | 2001-019983 | 1/2001 |
| JP | 2002-028463 | 1/2002 |
| JP | 2002-159832 | 6/2002 |
| JP | 2007-176125 | 7/2007 |

F I G. 1
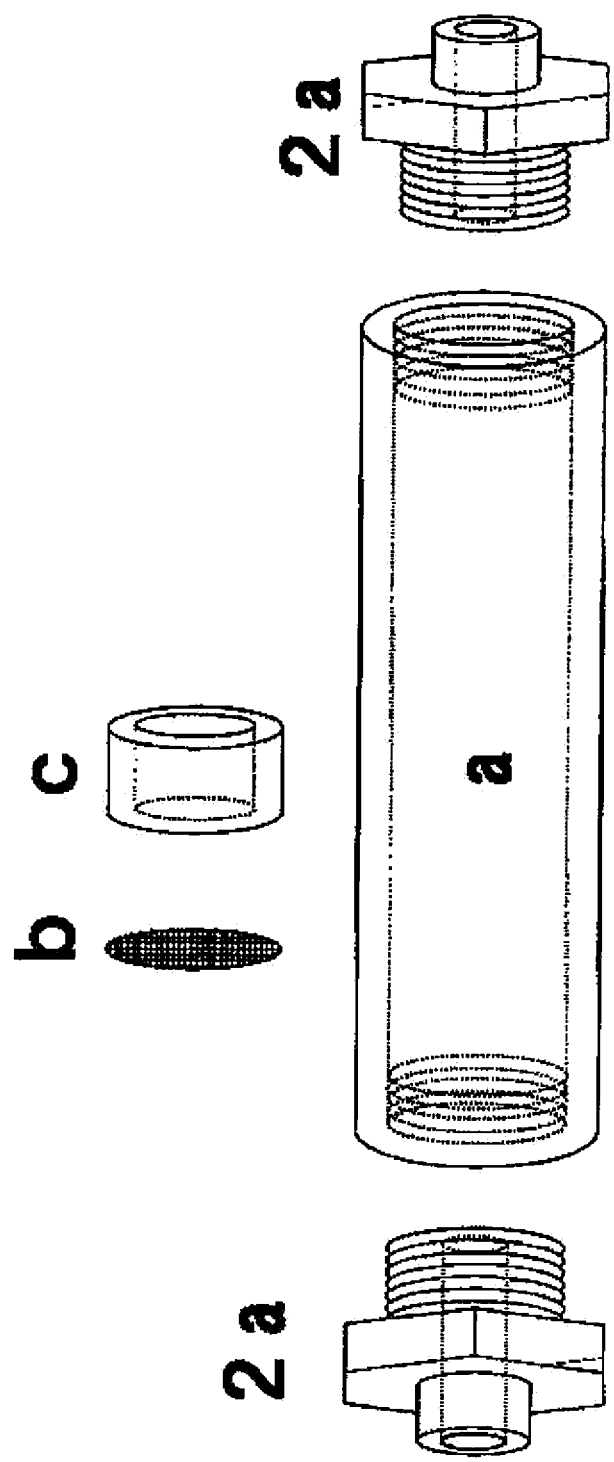

F I G. 4
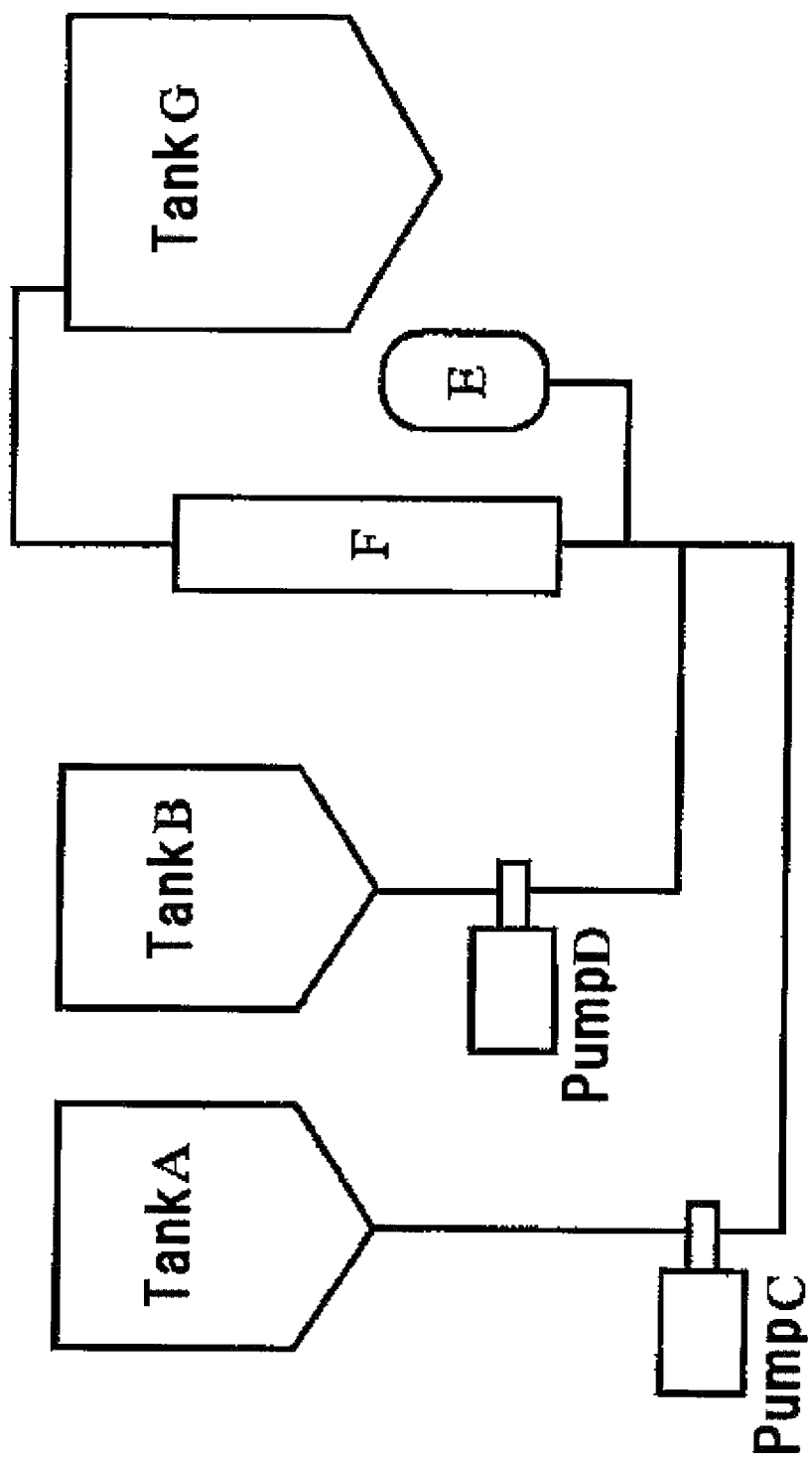

METHOD AND APPARATUS FOR CONTROLLING PARTICLE DIAMETER AND PARTICLE DIAMETER DISTRIBUTION OF EMULSION PARTICLES IN EMULSION

TECHNICAL FIELD

The present invention relates to a method and an apparatus for controlling the particle diameter and particle diameter distribution of fine particles of a hydrophobic material in an emulsion dispersed in the form of fine particles in a dispersion medium and, more particularly, to an emulsification method and an emulsification apparatus for mass-producing a uniform emulsion having a narrow particle diameter distribution of fine particles in a continuous and stable manner. The invention also relates to a microcapsule and polymer fine particles prepared using the emulsion produced using the above method and apparatus.

BACKGROUND ART

An emulsion includes a continuous liquid phase and a liquid-phase material that is immiscible with the continuous phase and dispersed therein as particles. Examples of well-known emulsions include O-W type emulsions in which oil droplets are dispersed in a water-based continuous phase and W-O type emulsions in which, in contrast to the O-W type emulsions, water-based liquid droplets are dispersed in an oil-based continuous phase. Examples of known methods of producing such emulsions include surface-chemical methods that use an emulsifying agent and mechanical methods that use a special emulsification apparatus. Generally, stable emulsions are produced using a combination of these two types of methods. It is generally known that, when the latter mechanical methods are used, the use of different emulsification apparatuses causes significant differences in the properties of obtained emulsions (the size of the liquid droplets of the dispersed phase and the particle diameter distribution of the liquid droplets).

At present, emulsions are important raw materials and products in industrial areas relating to various products such as cosmetics, foods, paints, paper products, films, and recording materials. The particle diameter and particle diameter distribution of liquid droplets serving as the dispersed phase of an emulsion are important factors that influence on the stability of the emulsion and the properties of final products. More specifically, in emulsions for cosmetics, the differences in the average particle diameters and particle diameter distributions of the emulsified and dispersed liquid droplets result in a difference in spreadability on the skin. Moreover, the above differences greatly influence on the stability of the products.

Microcapsules are obtained by forming a polymer film or the like on the interface between the continuous and dispersed phases of an emulsion, and polymer fine particles are obtained by polymerizing the polymerizable dispersed phase of an emulsion. Such microcapsule or polymer fine particles are produced by subjecting an emulsion to treatment using a method including the steps of polymerization, filtration washing, drying, sieving, pulverization, and the like. These microcapsules and polymer fine particles are also used in various industrial areas. Microcapsules are used as information recording materials, such as toners for copying machines and printers, which utilize the pressure sensitivity, thermo-sensitivity, and photo-sensitivity of the microcapsules. Microcapsules are also used as display materials, such as electronic paper, and as pharmaceuticals, agricultural chemicals, insecticides, aromatics, thermal storage materials, and the like. Polymer fine particles are used as: anti-blocking agents for plastic films; optical materials used to impart light-diffusion and reflection prevention functions and used for spacer applications; paints and inks used to mat or color construction materials or the interior parts of automobiles, to improve the texture thereof, or to impart other functions; materials used to impart smoothness to cosmetic foundations and the like; additives used to improve thermal resistance and solvent resistance of resins or to impart various properties, such as low shrink property, thereto; and diagnostic reagents and fine particle preparations used in the medical field. Microcapsules and polymer fine particles are also used for other applications such as pigments, dyes, conductive components, thermal recording paper, reinforcing materials for resins, additives in fats and oils, artificial stones, and chromatography. In both microcapsules and polymer fine particles, the particle diameter and particle diameter distribution of the produced particles are determined substantially at the emulsification stage. Therefore, it is no exaggeration to say that the properties of the produced emulsion determine the performance of final products. Accordingly, there is a need to develop an emulsification apparatus that can easily manufacture a product having a desired average particle diameter and particle diameter distribution, in particular, a narrow particle diameter distribution, irrespective of in which form the product is used, as an emulsion, microcapsules, or polymer fine particles.

Various mechanical methods of manufacturing emulsions have been proposed. In the most general method, raw materials are charged into a batch-type tank and emulsified by stirring the materials in the tank using stirring blades rotating at fast speed.

In this method, a dispersion medium and a dispersive liquid are mixed at an appropriate ratio to prepare a preliminary emulsion. Then the preliminary emulsion is further reduced in particle diameter and emulsified using emulsification means such as a high-speed stirrer (dissolver), homogenizer, or in-line mixer to thereby produce a stable emulsion. With such methods, high energy can be applied to an oil-based liquid when it is dispersed in a water-based medium. These methods are particularly effective to obtain an emulsion having a particle diameter of less than 10 μm.

However, in the above methods, during the dispersion of the oil-based liquid, the coalescence of the droplets thereof occurs frequently, and the dispersion and coalescence are repeated. Therefore, when the oil-based liquid contains fine particles therein, these fine particles may be transferred into the water-based medium, and this may cause a reduction in the amount of the fine particles in the oil-based liquid. Moreover, the water-based medium may be contaminated by the transferred fine particles. When the droplets of the oil-based liquid are formed into microcapsules, the transferred fine particles may adhere to the shell surfaces of the microcapsules during the formation thereof, so that the microcapsules themselves may be contaminated. In addition, since the shear force necessary for emulsification is exerted only on areas in close proximity to the stirring blades, the shear force is non-uniform, depending on the distance from the stirring blades. This may cause the broadening of the particle diameter distribution of the dispersed liquid droplets. Moreover, it is unfortunately difficult to scale up.

In some apparatuses, for example, a stirring unit for allowing the solutions to flow over the entire tank is attached separately from the stirring blades to prevent the above problems. However, it is very difficult to completely eliminate the problems. Moreover, when scale-up is performed, the stirring blades and the driving unit therefor increase in size and become expensive. The rotating members driven at high speed have precise structures, and this is disadvantageous for maintenance. When a large amount of materials must be emulsified, the emulsification operation takes a long time. In such a case, the materials can be denatured during the emulsification operation.

To solve the problems in the batch-type emulsification methods, continuous emulsification methods have been proposed.

For example, Japanese Patent Application Laid-Open No. Hei 5-49912 discloses an emulsification method in which raw materials for emulsification are emulsified by rotating a cylindrical rotor having protruding edges on its outer wall inside a cylindrical stator having protruding edges on its inner wall to apply a shear force to the raw materials while the raw materials are allowed to pass through the gap between the stator and the rotor. In this method, the strength of the shear force is determined by the rotation speed of the rotor. Therefore, when a large shear force is required, i.e., an emulsion containing small liquid droplets of the dispersed phase is produced, a very large power unit is required. Moreover, when the amount of the emulsion produced per unit time is increased, the residence time of the raw materials for emulsification in the emulsification apparatus decreases. This causes the problem in that an emulsion including a dispersed phase having a uniform particle diameter distribution is not obtained. In addition, since the shapes of the protrusions are complicated and the gap between the inner wall of the stator and the outer wall of the rotor is very small, the machining and maintenance of the apparatus are difficult.

Japanese Patent Application Laid-Open No. Hei 6-142492 (U.S. Pat. No. 5,554,323) discloses a method of manufacturing microcapsules. In this method, preliminary emulsification is performed under stirring. Then a double cylinder-type continuous emulsification apparatus is used to produce an emulsion having a broad particle diameter distribution by changing the rotation speed of the inner cylinder of the apparatus continuously or stepwise. There is a description that an emulsion having a broad particle diameter distribution can be manufactured using this method. The feature of the method is that the emulsion does not contain excessively large particles and excessively small particles. However, in this method, the amounts of raw materials charged and the rotation speed of the inner cylinder of the emulsification apparatus must be controlled, and therefore the operation is complicated. In addition, when the materials to be emulsified are reactive, the apparatus can be clogged.

Japanese Patent Application Laid-Open No. Hei 9-029091 (U.S. Pat. No. 5,785,423) discloses a continuous emulsification method comprising feeding an oil phase solution continuously from the bottom of an emulsification tank including stirring blades, feeding a water phase solution continuously from the lower side-portion of the emulsification tank, and discharging an emulsion continuously from the upper portion of the emulsion tank. There is the description that this method can prevent the clogging of the emulsification apparatus even when the raw materials for emulsification are reactive compounds. However, when the rate of emulsification is increased, the particle diameter distribution of the dispersed phase deteriorates also in this method. In the worst case, non-emulsified raw materials may be discharged through a short path.

Japanese Patent Application Laid-Open No. Hei 5-212270 discloses a continuous emulsification method using a porous glass pipe. With this method, the apparatus used is expensive. When the raw materials are reactive, the porous glass pipe may be clogged. Moreover, the particle diameter of the emulsion is determined by the pressure used to extrude the raw material to be emulsified from the porous glass pipe and the flow state of a fluid that forms the continuous phase. Therefore, the operation conditions for controlling the particle diameter are complicated. Another problem is that, since the porous glass pipe is expensive, extra cost is required for scale-up.

Japanese Patent Application Laid-Open Nos. Hei 2-261525 and Hei 9-201521 disclose methods and apparatuses for instantaneously emulsifying raw materials for emulsification by collision at ultrahigh pressure and high speed. In these apparatuses, the operating pressures thereof are very high, so the apparatus bodies must have rigid structures. Another problem is that the degree of abrasion of the apparatus is high. The emulsification in the above apparatus is based on the impact force of the collision of the raw materials for emulsification and is difficult to control. One disadvantage of these methods and apparatuses is that the particle diameter distribution of the liquid droplets of the dispersed phase in the emulsion is highly non-uniform.

Japanese Patent Application Laid-Open No. 2000-254469 (U.S. Pat. No. 6,379,035) discloses a static mixing and stirring apparatus having a structure in which a plurality of disk-shaped elements having a plurality of hole portions (having, for example, a truncated polygonal pyramid shape or truncated conical shape) are disposed in a cylindrical case at predetermined intervals in their thickness direction. Japanese Patent Application Laid-Open No. 2002-28463 discloses a fluid mixer that includes a cylindrical body having a rectangular cross-section and a plurality of pairs of first and second assembled plate bodies that are fitted inside the cylindrical body. The first assembled plate body includes a quadrilateral base plate and solid hollow pentagonal bodies continuously arranged thereon and has a through hole at the center, and the second assembled plate body has a recessed portion of any shape at the center. These apparatuses are mixers for liquid but can be used as emulsification apparatuses. However, some problems of these apparatuses include not only that the shapes of the elements used are complicated but also that the arrangement of the elements must be precisely adjusted in the apparatus.

Japanese Patent Application Laid-Open No. 2002-159832 (US2002/060950A1) discloses an emulsion producing apparatus comprising mixing means for mixing a plurality of liquids with each other, a pressurizing pump for pressurizing the mixture liquid, and emulsifying means for bringing the mixture liquid pressurized by and delivered from the pressurizing pump into an emulsified state. The emulsifying means includes a plurality of chambers partitioned by partition walls each having at least one small hole, and the mixture liquid flows into the plurality of chambers. In this apparatus, raw materials for emulsification are injected from the small hole into an adjacent space at high speed and high pressure. The raw materials for emulsification are pulverized and destroyed by a strong impact force at the time of injection and are thereby emulsified. More specifically, only the destroying phenomenon by the impact is used as the emulsification principle. Since the destroying phenomenon by the impact is difficult to control, the particle diameter of the obtained emulsion tends to be non-uniform. Moreover, since a high pressure is used for injection, the emulsification apparatus must have a rigid structure.

As has been described, the continuous emulsification methods and apparatuses proposed previously are not satisfactory because of poor uniformity of the liquid droplets of the dispersed phase in obtained emulsions, difficulty in scale-up, complexity of the apparatus and their maintenance, and other reasons.

DISCLOSURE OF THE INVENTION

The present invention solves the problems in the conventional continuous emulsification methods and apparatuses. The invention provides a continuous emulsification method and an apparatus used to obtain an emulsion containing liquid droplets having a desired average particle diameter and a desired particle diameter distribution, in particular, a narrow (uniform) particle diameter distribution, suitable for the various applications described above. The method and apparatus are easily controlled and have simple structures, and the scale-up and maintenance thereof are easy. Moreover, the method and apparatus can provide an emulsified product in an amount sufficient for industrial production. It is another object to provide various industrial products, such as microcapsules and polymer fine particles, having a desired average particle diameter and a desired particle diameter distribution, in particular, a narrow (uniform) particle diameter distribution, suitable for the various applications described above. These industrial products are provided using an emulsion obtained by the above method and apparatus.

A first aspect of the present invention is a method for controlling a particle diameter and a particle diameter distribution of emulsion particles during manufacturing of an emulsion dispersion, the method comprising causing two or more types of liquids substantially immiscible with each other to successively and continuously pass through net bodies to thereby control the particle diameter and the particle diameter distribution of the emulsion particles, the net bodies being disposed in a cylindrical flow passage at intervals of 5 to 200 mm, the number of the net bodies being more than 50 and 200 or less, each of the net bodies being equivalent to a gauze having a mesh number of 35 mesh to 4000 mesh in accordance with an ASTM standard, each of the net bodies having a surface crossing a direction of the flow passage.

A second aspect of the present invention is an emulsification apparatus comprising: a feed pump for feeding two or more types of liquids substantially immiscible with each other; a cylindrical flow passage having a first end from which the two or more types of liquids fed by the feed pump are introduced and a second end to which the two or more types of liquids passing through the cylindrical flow passage are directed; and net bodies disposed in the cylindrical flow passage at intervals of 5 to 200 mm, the number of the net bodies being more than 50 and 200 or less, each of the net bodies being equivalent to a gauze having a mesh number of 35 mesh to 4000 mesh in accordance with an ASTM standard, each of the net bodies having a surface that intersects a direction of the flow passage, wherein the liquids pass sequentially through the net bodies and are thereby emulsified.

The net bodies are, for example, gauzes.

The present invention also relates to microcapsules or polymer fine particles that are manufactured using an emulsion obtained by the above method and apparatus.

In the present invention, an emulsification apparatus having an extremely simple structure is used. The emulsification apparatus comprises a cylindrical flow passage and a predetermined number of net bodies disposed in the cylindrical flow passage at predetermined intervals and each having a certain mesh size. Each net body has a surface intersecting the direction of the flow passage. Two or more types of liquids used as raw materials for emulsification are caused to sequentially pass through the net bodies to thereby control the liquid droplets of the dispersed phase. In this manner, an emulsion having a desired average particle diameter and a desired particle diameter distribution can be continuously obtained in a large amount. In particular, according to the present invention, a uniform emulsion having a particle diameter distribution of the liquid droplets which is narrower than those of conventional products can be obtained. Since the present apparatus has a simple structure, it can be easily disassembled and is easy to maintain. By using the emulsion obtained by the present emulsification apparatus, microcapsules and polymer particles having a desired particle diameter and a desired particle diameter distribution can be obtained. In particular, according to the present invention, microcapsules and polymer particles having a particle diameter distribution of the liquid droplets which is narrower than those of conventional products can be obtained. The emulsion obtained by the emulsification method of the present invention can be suitably used as raw materials and products in industrial areas relating to various products such as cosmetics, foods, paints, paper products, films, and recording materials. When the emulsion is used in cosmetics, excellent spreadability on the skin can be obtained, and the stability of the products is also good.

The microcapsules obtained using the emulsion are suitably used as information recording materials, such as toners for copying machines and printers, which utilize the pressure sensitivity, thermo-sensitivity, and photo-sensitivity of the microcapsules. The microcapsules are also suitably used as display materials such as electronic paper and as pharmaceuticals, agricultural chemicals, insecticides, aromatics, thermal storage materials, and the like. The polymer fine particles obtained using the emulsion can be suitably used as: anti-blocking agents for plastic films; optical materials used to impart light-diffusion and reflection prevention functions and used for spacer applications; paints and inks used to mat or color construction materials or the interior parts of automobiles, to improve the texture thereof, or to impart other functions; cosmetic materials used to impart smoothness to foundations and the like; additives used to improve thermal resistance and solvent resistance of resins and to impart various properties, such as low shrink property, thereto; and diagnostic reagents and fine particle preparations used in the medical field. The microcapsules and polymer fine particles are also used for other applications such as pigments, dyes, conductive components, thermal recording paper, reinforcing materials for resins, additives in fats and oils, artificial stones, and chromatography. The microcapsules and the polymer fine particles are available as products having desired average particle diameters and particle diameter distributions, in particular, narrow particle diameter distributions. Therefore, when the microcapsules and the polymer fine particles are used in the above applications, they provide better performances than conventional products.

BRIEF DESCRIPTION OF THE DRAWINGS

FIG. 1 is a perspective view of an example of the configuration of a continuous emulsification apparatus of the present invention.

FIG. 4 is a diagram illustrating a flow chart including raw emulsification material tanks, plunger pumps, an emulsification apparatus F, and a product tank.

Figure 2:
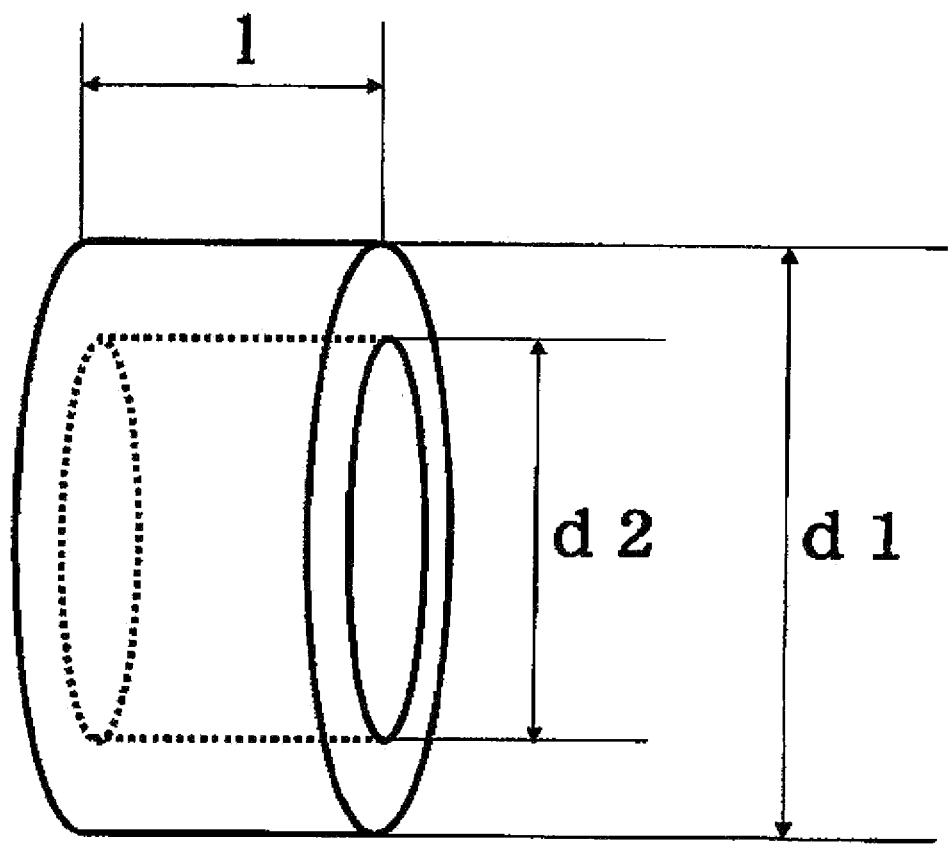
FIG. 2 is a perspective view of a spacer "c" used in the present invention.

In the drawings, reference sign "a" denotes a casing; "b" a gauze; "c" a spacer; and "2a" a stopper.

BEST MODE FOR CARRYING OUT THE INVENTION

In an emulsification method of the present invention, two or more types of liquids substantially immiscible with each other are fed to an emulsification apparatus in which a predetermined number of net bodies are disposed in a cylindrical flow passage at predetermined intervals. Each net body has a predetermined mesh size and includes a surface that intersects the direction of the flow passage. The liquids are emulsified by causing them to sequentially pass through the net bodies.

The two or more types of fluids to be fed to the flow passage as raw materials for emulsification need not be mixed in advance. The raw materials for emulsification may be delivered using an appropriate feed pump and may be fed independently. For example, when an O-W type emulsion is manufactured, an oil and water may be fed to the flow passages using separate feed pumps. Of course, they may be mixed in advance. No specific limit is imposed on the manner of mixing at the time of introduction into the emulsification apparatus. An apparatus for mixing, such as a stirrer, need not be used. It is generally preferable that a mixture obtained by in-line blending be introduced. If the raw materials for emulsification are in an unmixed and separated state, i.e., form separate flows that reach the net bodies independently, emulsification by fluid division through the net bodies, which is an emulsification mechanism of the present invention described later, is difficult to achieve. Therefore, it is preferable that the raw materials for emulsification in a certain pre-mixed state reach the net bodies. The degree of mixing obtained by in-line blending described above is sufficient for the degree of mixing used.

An appropriate amount of a dispersing agent (emulsifying agent) may be added in advance to the raw materials for emulsification to be fed. If necessary, the dispersing agent (emulsifying agent) may be independently fed directly to the emulsification apparatus.

The flow rate of the fluid flowing through the flow passage of the emulsification apparatus is not necessarily as high as a flow rate that causes collision and breakage of liquid droplets considering a division of a fluid flow by the net bodies that are used as the emulsification mechanism (described later) in the present invention. However, when the flow rate is too low, small droplets formed by dividing the liquid flow are more likely to agglomerate again. Therefore, an appropriate flow rate is maintained. Preferably, the linear velocity is about 0.1 to 50 cm/sec. More specifically, in the present invention, the net bodies, for example, gauzes, having large opening areas are used, as described below. Although a plurality of the net bodies are used, they are disposed at predetermined intervals, and the pressure loss in the fluid system can thereby be reduced. Therefore, the fluid can have a relatively large linear velocity, and this allows the material throughput per unit time to be increased.

A predetermined number of the net bodies are disposed in the flow passage at predetermined intervals. The fed raw materials for emulsification sequentially pass through the plurality of net bodies. During this process, emulsification proceeds and is then completed. Each of the net bodies has a surface that intersects the direction of the flow passage. No specific limit is imposed on the extent of intersection so long as the flow is divided by the emulsification mechanism of the present invention (described later). Preferably, the surfaces of the net bodies are substantially perpendicular to the direction of the flow passage.

The present inventors interpret functions and effects of the emulsification mechanism and the net bodies in the present invention as follows. While the fluid successively passes through the net bodies, it is divided into small droplets by a large number of fine holes of the net bodies. Only droplets having large particle diameters among the small droplets are further divided by subsequent net bodies. This may result in uniformity of the particle diameter of the liquid droplets of the dispersed phase.

When the distance from a net body to a subsequent net body is long, small droplets generated by the first net body can agglomerate before they reach the second net body. Therefore, it is important that the distance is not too long and not too short and is set appropriately.

The intervals between the net bodies are 5 mm to 200 mm, depending on the flow rate, viscosity, and the like of the fluid in the flow passage. Preferably, the intervals are 10 mm to 100 mm. Preferably, long intervals are used for high flow rates, and, in contrast, short intervals are used when the viscosity of the fluid is high.

The number of the disposed net bodies is an important factor in the present invention and is greater than 50 and 200 or less. When the number is 50 or less, the uniformity of the particle diameter of the liquid droplets of the dispersed phase in the emulsion is poor. When the number exceeds 200, the pressure during the emulsification operation becomes significantly high, which is not preferred.

Gauzes are conveniently used as the net bodies. This is because gauzes have certain mechanical strength and different types of gauzes having various mesh sizes are available. Therefore, the degree of opening, density, and the like of the fine holes can be appropriately selected according to the mesh size. Any net bodies made of any material can be appropriately used so long as they are equivalent to gauzes.

The mesh number of the net bodies is preferably 35 mesh to 4000 mesh in accordance with an ASTM standard and more preferably 150 mesh to 3000 mesh.

If necessary, the net bodies used may have a multilayer stack structure for the purpose of, for example, reinforcement. Net bodies having an excessively large thickness are not preferred. Therefore, the thickness of the gauzes is generally several mm or less, even when multilayer stacks are employed. It is preferable that the gauzes be supported by appropriate spacers (described later) or the like to reinforce the mechanical strength of the gauzes. Generally, the thickness of gauzes used as filters in various liquid and gas filtration applications is enough.

No specific limit is imposed on the temperature in the flow passage during emulsification operation. However, in order to appropriately adjust the viscosity, the space within the flow passage may be cooled or heated. A preferred temperature in the flow passage is 10 to 40° C.

Also, the pressure may be appropriately changed in order to adjust the flow rate of the fluid. More specifically, the pressure that can maintain the preferable flow rate described above is sufficient, and a particularly high pressure is not required. A high-pressure fluid is not preferred because the time necessary to stabilize the fluid between the plurality of net bodies is not obtained. In such a case, the frequency of collision and pulverization increases, and the fluid is divided excessively. This causes an increase in instability. The pressure in the flow passage is preferably 0.01 to 5.0 MPa.

Hereinafter, an apparatus used for the method of the present invention is described in detail with reference to the accompanying drawings.

An emulsification apparatus in FIG. 1 includes a cylindrical casing "a", units each composed of a pair of a gauze "b" and a spacer "c" inside the casing and stoppers 2a for securing the units.

The spacers "c" are used to hold a plurality of the gauzes "b" at predetermined intervals.

The length of the casing "a" is determined by the length of the unit composed of the gauze "b" and the spacer "c" and the number of the units secured inside the casing "a." The pressure resistance of the casing "a" is determined by the amount (pressure) of the raw materials for emulsification fed to and flowing through the secured units and is appropriately designed. No specific limit is imposed on the cross-sectional shape of the casing into which the units are inserted. However, a cylindrical shape shown in FIG. 1 is preferred from the viewpoint of workability and pressure resistance or to prevent the liquid passing through the inside of the casing from remaining therein. No specific limit is imposed on the materials for the casing "a," the gauzes "b," the spacers "c," and the stoppers 2a so long as the materials are resistant to corrosion by the raw materials for emulsification passing therethrough and have strengths enough to resist the pressure generated during the emulsification operation.

In FIG. 1, the shape of the gauzes "b" is configured such that the shape and the size thereof are substantially the same as those of the interior cross-section of the cylindrical casing "a." With the above shape and size, the gauzes "b" can be secured inside the cylindrical casing "a" without distortion, and the raw materials for emulsification are caused to pass through the flow passage formed by the plurality of units in a reliable manner. When a gauze "b" and a spacer "c" are stacked to form a unit, their contact surfaces must be brought into intimate contact with each other. This allows the raw materials for emulsification to pass only through the flow passage formed by the gauzes "b" and the spacers "c" so that the raw materials for emulsification are emulsified in a reliable manner.

Preferably, gauzes b having mesh numbers in the range of 35 mesh to 4000 mesh in accordance with the ASTM standard are used. The mesh number may be appropriately selected according to the raw materials for emulsification used and the target size of the liquid droplets of the dispersed phase in the emulsion. When the mesh number is less than 35 mesh, the emulsification action deteriorates considerably, which is not preferable. When the mesh number exceeds 4000 mesh, the operating pressure during the emulsification operation becomes excessively high. This is not preferable because emulsification cannot be achieved. The mesh number of the gauzes is more preferably 150 mesh to 3000 mesh. No specific limit is imposed on the shape of the gauzes. However, any of plain-woven, twilled, plain dutch woven, twilled dutch woven, and quadruple twilled woven gauzes may be preferably used.

For the purpose of surface protection, maintenance of strength, and dispersion control, the gauzes may have a multilayer structure in which a plurality of layers are stacked. Hereinafter, a gauze included in the multilayer structure and used for emulsification is referred to as a main gauze. No specific limit is imposed on the form of the material stacked on the main gauze so long as the surface protection, maintenance of strength, and dispersion control can be achieved by the material. Preferably, punched metal, a gauze, and the like are preferred. When a gauze (hereinafter referred to as a "sub-gauze") is used for the above purpose, the mesh number (ASTM standard) of the sub-gauze must be less than the mesh number of the main gauze (the meshes of the sub-gauze must be greater than those of the main gauze). In the emulsification apparatus for use in the manufacture of the polymer fine particles of the present invention, the properties of the obtained emulsion are determined by the gauze having the largest mesh number (main gauze) among the gauzes disposed in the flow passage of the emulsification apparatus. Therefore, it is not preferable to use a sub-gauze having a mesh number greater than that of a main gauze. When a main gauze including a plurality of stacked layers is used, it is preferable to secure each layer by, for example, sintering for the purpose of preventing the deformation or the like of the main gauze in the flow passage of the emulsification apparatus.

In the emulsification apparatus for use in the manufacture of the polymer fine particles of the present invention, as described above, the distances between the net bodies are related to emulsification and the stabilization of the liquid droplets of the dispersed phase in the emulsion. Therefore, the net bodies must be secured in predetermined positions in the cylindrical flow passage at predetermined intervals. For example, the spacers are used to achieve this purpose. FIG. 2 shows the spacer "c."

No specific limit is imposed on the length L of the spacer. However, the length L corresponds to the preferred distance between the net bodies described above and is preferably 5 mm to 200 mm. The length L is more preferably 7 mm to 100 mm and particularly preferably 10 mm to 100 mm. When the length of the spacer is less than 5 mm, the particle diameter of the liquid droplets of the dispersed phase in the emulsion becomes non-uniform, which is not preferred. When the length of the spacer is greater than 200 mm, the length of the main body of the emulsification apparatus becomes too long. In this case, agglomeration (aggregation) of the liquid droplets of the dispersed phase in the emulsion occurs undesirably in the spacer portions (the spaces between the net bodies), or a dead space is undesirably formed. Preferably, the outer diameter d1 of the spacers is close to the inner diameter of the casing, provided that the spacers can be inserted into the cylindrical casing "a." This allows the gauzes to be perfectly secured inside the flow passage and allows the raw materials for emulsification to be guided to the flow passage formed by the spacers and the gauzes in a reliable manner. Preferably, the inner diameter d2 of the spacers is set, relative to the outer diameter d1, within the range so that $(d1-d2)/d1=0.01$ to $0.5$. A more preferable range is 0.1 to 0.3. When this value is less than 0.01, the gauzes are not secured appropriately, which is not preferable. When the value is greater than 0.5, the flow passage is considerably reduced in size, and this undesirably results in a reduction in emulsification efficiency.

When the emulsification apparatus of the present invention is used, a plurality of units each composed of a pair of the gauze "b" and the spacer "c" are inserted into the cylindrical casing "a." The number of the inserted units is more than 50 and 200 or less. When the number of units is or less, the uniformity of the particle diameter of the liquid droplets of the dispersed phase in the emulsion is poor, which is not preferable. When the number exceeds 200, the pressure during the emulsification operation becomes significantly high, which is not preferred.

Figure 3:
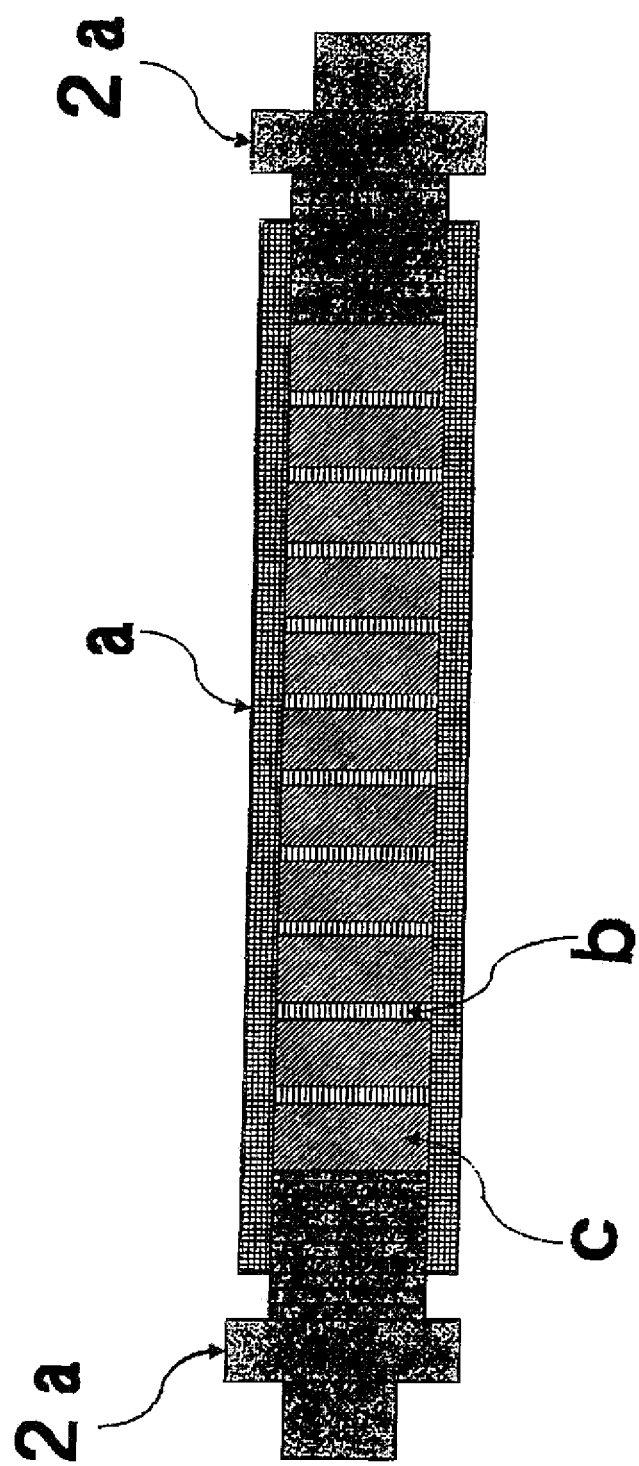
FIG. 3 is a schematic cross-sectional view of the emulsification apparatus of the present invention.

FIG. 3 is a schematic cross-sectional view illustrating the emulsification apparatus of the present invention. In the present invention, the number of the units exceeds 50. However, in FIG. 3, the number of the illustrated units is 10 for easy understanding. In the example shown in FIG. 3, one additional spacer, in addition to 10 units of the gauze and spacer, is inserted into the casing, so that the surface of the gauze is prevented from being damaged by the contact between the gauze and a stopper. In this example, each unit is secured inside the casing by screwing the stoppers into the casing. However, no specific limit is imposed on the manner of securing so long as the same function can be obtained. For example, clamps or flanges may be used.

In the emulsification apparatus of the present invention, the cylindrical casing may be heated or cooled from the outside, if necessary. In this manner, the temperature during emulsification can be controlled. The temperature of the casing is controlled, for example, by attaching a band- or ribbon-like heater to the exterior of the casing, using an open- or closed-type tubular electric furnace, or attaching a heating or cooling jacket to the exterior of the casing.

Next, the procedure for introducing the raw materials into the emulsification apparatus of the present invention and performing emulsification is specifically described with reference to FIG. 4. In FIG. 4, tanks A and B are tanks for the raw materials for emulsification.

For example, a hydrophobic liquid, such as a hydrocarbon-based solution, is stored in the tank A, and water is stored in the tank B.

A dispersing agent (emulsifying agent) is charged into any one of the raw material tanks. In the above example, the dispersing agent is stored as an aqueous solution in the tank B.

No specific limit is imposed on the amount and type of the dispersing agent (emulsifying agent) used. Any of dispersing agents (emulsifying agents) such as anionic, cationic, nonionic, and amphoteric surfactants may be used. For example, to emulsify a hydrocarbon liquid in water, PVA (polyvinyl alcohol) may be used as the dispersing agent (emulsifying agent), and an aqueous solution of about 1 percent by mass may be used.

A stirrer, a heater, and the like may be attached to each of the tanks A and B for the purpose of preparing the raw materials for emulsification. Pumps C and D are plunger pumps that can regulate flow rates and are used to introduce the raw materials for emulsification into the emulsification apparatus at any desirable ratio. No specific limit is imposed on the amounts of fed liquids. Generally, the amounts are about 6 to 3,000 ml/cm²/min.

The raw materials for emulsification from the respective pumps are fed to an inlet-side line of the emulsification apparatus F and are in-line blended, and the mixture is introduced into the emulsification apparatus F.

An accumulator E for preventing pulsation of the fluid may be disposed on the pump side (on the upstream of the inlet for the raw materials for emulsification) of the emulsification apparatus F. Any pumps capable of stably supplying the raw materials at target flow rates may be used to introduce the raw materials to the emulsification apparatus F. No specific limit is imposed on the types of the pumps. For example, the plunger pump described above may be used.

After emulsification in the emulsification apparatus F, the product is received by a tank G. The tank G is used as a reception tank for the emulsion used as the product.

If necessary, a stirrer, a heater, and the like may be attached to the product tank G for the purpose of performing a reaction, such as encapsulation or polymerization, using the emulsion.

During the emulsification operation, the raw materials are introduced from the tanks A and B into the emulsification apparatus F through the pumps C and D at any desirable ratio and any desirably flow rate, and the produced emulsion is introduced into the reception tank G.

According to the present invention, any of hydrocarbon-based solutions and monomers such as acrylic monomers (e.g. MMA) and styrene monomers can be emulsified in an appropriate medium such as water.

No specific limit is imposed on the particle diameter of the droplets of the dispersed solution in the emulsion obtained by the present invention. Generally, the particle diameter is in the range of 0.1 to 200 μm (the volume average particle diameter as measured by the Coulter Counter method), and the coefficient of variation (CV value (%) described later) is in the range of about 60% to about 30%. However, particles having any desirable volume average particle diameter and coefficient of variation can be obtained by adjusting various conditions such as the mesh sizes of the gauzes and the type of the dispersing agent (emulsifying agent) in accordance with need.

As shown in Examples, particles having a particle diameter of 3 μm and a narrow size distribution having a CV value (%) of 25% or less can be obtained.

Moreover, by adding a monomer, such as methylol melamine, for forming a capsule membrane to the obtained emulsion and polymerizing the monomer at the interfaces of the particles by a routine method, the liquid droplets can be easily encapsulated. The particle state and dispersion state of the obtained capsules correspond to those of the emulsion.

The emulsion according to the present invention can be a water-based emulsion of a monomer such as methyl methacrylate (MMA) monomer or styrene monomer. By preparing such an emulsion containing an initiator by a routine method and heating the emulsion to polymerize the droplets, polymer particles having a particle (emulsion) state and a dispersion state corresponding to those of the original emulsion can be similarly obtained.

In the present invention, an emulsification apparatus having an extremely simple structure in which only a plurality of net bodies such as gauzes are disposed in a flow passage of fluid is used. With such an apparatus, an emulsion containing liquid droplets of the dispersed phase with a uniform diameter can be continuously obtained in a large amount. Since the present apparatus has a simple structure, it can be easily disassembled and easy to maintain. By using the emulsion obtained by the present emulsification apparatus, microcapsules and polymer particles with uniform particle diameters can be obtained.

Hereinafter, the present invention will be specifically described by way of Examples.

Manufacturing Example 1

An emulsification apparatus was produced by inserting, into a cylindrical casing having an inner diameter of 20 mm, 10 units each composed of a gauze including a main gauze of 1400 mesh and a spacer having a length of 10 mm and an inner diameter of 15 mm. The length of the casing was about 120 mm.

Naphtesol being a hydrocarbon-based solvent (product of NIPPON OIL CORPORATION) and an aqueous solution of a dispersing agent (1 percent by mass of PVA205, product of KURARAY Co., Ltd.) were used as the raw materials for emulsification. The raw materials were introduced into the emulsification apparatus at flow rates of 100 ml/min and 200 ml/min using separate plunger pumps to obtain an O-W type emulsion. The volume average diameter of the liquid droplets of the dispersed phase of the emulsion (hereinafter referred to as a "volume average particle diameter") and the particle diameter distribution of the liquid droplets were measured using the Coulter Counter (Multisizer II, product of Beckman Coulter Inc.). The number of particles measured was 100,000. The results showed that the volume average particle diameter of the liquid droplets was 20 μm and the CV value was 30%.

The CV value used as an index of the liquid droplet size distribution was calculated using the following equation.

CV value=(Standard deviation of liquid droplet size distribution)/(volume average particle diameter)× 100

The same method was used to measure the volume average particle diameter and the CV value in the following Examples and Comparative Examples.

Manufacturing Example 2

The same procedure as in Manufacturing Example 1 was repeated except that the number of the units in the casing was 40, whereby an emulsion was manufactured. The volume average particle diameter of the dispersed phase was 18 µm, and the CV value was 24%.

Manufacturing Example 3

The same procedure as in Manufacturing Example 1 was repeated except that a main gauze with 250 mesh was used, whereby an emulsion was manufactured. The volume average particle diameter of the dispersed phase was 55 µm, and the CV value was 25%.

Manufacturing Example 4

The same procedure as in Manufacturing Example 1 was repeated except that a main gauze with 2400 mesh was used, whereby an emulsion was manufactured. The volume average particle diameter of the dispersed phase was 10 µm, and the CV value was 24%.

Manufacturing Example 5

The same procedure as in Manufacturing Example 1 was repeated except that the raw materials for emulsification were changed to SAS296 (product of NIPPON OIL CORPORATION) containing 5 percent by mass of crystal violet lactone dissolved therein and an aqueous solution of a dispersing agent (5 wt %, Micron8020, Nissho Kogyo Co., Ltd.), whereby an emulsion was manufactured. Methylol melamine M3 (product of Sumika Chemtex Co., Ltd.) was added to the obtained emulsion such that the solid content of methylol melamine was 20 percent by mass relative to SAS296, and the mixture was heated at 60° C. and stirred for 3 hours to carry out encapsulation. The volume average particle diameter of the capsules was 10 µm, and the CV value was 28%. The obtained capsule slurry was diluted to four times with water, and the diluted solution was applied to commercial CF paper. No coloring was observed, and the completion of encapsulation was confirmed.

Manufacturing Example 6

An emulsification apparatus was produced by inserting, into a cylindrical casing having an inner diameter of 15 mm, 50 units each composed of a spacer having a length of 10 mm and an inner diameter of 10 mm and a gauze including a main gauze of 400/3000 mesh. The length of the casing was about 330 mm.

Methyl methacrylate (MMA) containing 1 percent by mass of benzoyl peroxide (an initiator) and 20 percent by mass of ethylene glycol dimethacrylate (a cross-linking agent) dissolved therein and an aqueous solution of a dispersing agent (3 percent by mass of PVA217, product of KURARAY Co., Ltd.) were used as the raw materials for emulsification. Emulsification operation was performed by introducing the raw materials into the emulsification apparatus at flow rates of 17 ml/min and 33 ml/min using separate plunger pumps to obtain an O-W type emulsion. The obtained emulsion was heated and stirred at 110 to 115° C. for 30 minutes in a nitrogen atmosphere at an increased pressure of 0.3 MPa to obtain solid MMA polymer fine particles. The volume average particle diameter of the dispersed phase (polymer fine particles) measured by the same method as that in Manufacturing Example 1 was 4.6 µm, and the CV value was 22%.

Manufacturing Example 7

The same procedure as in Manufacturing Example 6 was repeated except that the number of the units in the casing was 100, whereby polymer fine particles were manufactured. The volume average particle diameter of the polymer fine particles measured by the same method as that in Manufacturing Example 1 was 4.1 µm, and the CV value was 21%.

Manufacturing Example 8

The same procedure as in Manufacturing Example 6 was repeated except that the number of the units in the casing was 150, whereby polymer fine particles were manufactured. The volume average particle diameter of the polymer fine particles measured by the same method as that in Manufacturing Example 1 was 3.8 µm, and the CV value was 21%.

Manufacturing Example 9

The same procedure as in Manufacturing Example 6 was repeated except that the number of the units in the casing was 200, whereby polymer fine particles were manufactured. The volume average particle diameter of the polymer fine particles measured by the same method as that in Manufacturing Example 1 was 3.7 µm, and the CV value was 20%.

Manufacturing Example 10

The same procedure as in Manufacturing Example 6 was repeated except that the concentration of the aqueous solution of the dispersing agent (PVA217, product of KURARAY Co., Ltd.) was changed from 3 percent by mass to 5 percent by mass, whereby polymer fine particles were manufactured. The volume average particle diameter of the polymer fine particles measured by the same method as that in Manufacturing Example 1 was 3.2 µm, and the CV value was 25%.

Manufacturing Example 11

The same procedure as in Manufacturing Example 6 was repeated except that the concentration of the aqueous solution of the dispersing agent (PVA217, product of KURARAY Co., Ltd.) was changed from 3 percent by mass to 5 percent by mass and that the number of the units in the casing was 100, whereby polymer fine particles were manufactured. The volume average particle diameter of the polymer fine particles measured by the same method as that in Manufacturing Example 1 was 2.9 µm, and the CV value was 22%.

Manufacturing Example 12

The same procedure as in Manufacturing Example 6 was repeated except that the concentration of the aqueous solution of the dispersing agent (PVA217, product of KURARAY Co., Ltd.) was changed from 3 percent by mass to 5 percent by mass and that the number of the units in the casing was 150, whereby polymer fine particles were manufactured. The volume average particle diameter of the polymer fine particles measured by the same method as that in Manufacturing Example 1 was 2.7 µm, and the CV value was 21%.

Manufacturing Example 13

The same procedure as in Manufacturing Example 6 was repeated except that the concentration of the aqueous solution of the dispersing agent (PVA217, product of KURARAY Co., Ltd.) was changed from 3 percent by mass to 5 percent by mass and that the number of the units in the casing was 200, whereby polymer fine particles were manufactured. The volume average particle diameter of the polymer fine particles measured by the same method as that in Manufacturing Example 1 was 2.5 μm, and the CV value was 20%.

Manufacturing Example 14

The same procedure as in Manufacturing Example 5 was repeated except that one of the raw materials for emulsification was changed to styrene containing 1 percent by mass of benzoyl peroxide dissolved therein, whereby polystyrene particles were obtained. The volume average particle diameter of the polymer fine particles measured by the same method as that in Manufacturing Example 1 was 11 μm, and the CV value was 24%.

Manufacturing Example 15

The same procedure as in Manufacturing Example 6 was repeated except that the number of the units in the casing was 10, whereby polymer fine particles were manufactured. The volume average particle diameter of the polymer fine particles measured by the same method as that in Manufacturing Example 1 was 9.4 μm, and the CV value was 51%.

Manufacturing Example 16

The same procedure as in Manufacturing Example 6 was repeated except that the number of the units in the casing was 20, whereby polymer fine particles were manufactured. The volume average particle diameter of the polymer fine particles measured by the same method as that in Manufacturing Example 1 was 5.9 μm, and the CV value was 31%.

Manufacturing Example 17

The same procedure as in Manufacturing Example 6 was repeated except that the number of the units in the casing was 30, whereby polymer fine particles were manufactured. The volume average particle diameter of the polymer fine particles measured by the same method as that in Manufacturing Example 1 was 5.1 μm, and the CV value was 24%.

Manufacturing Example 18

The same procedure as in Manufacturing Example 6 was repeated except that the number of the units in the casing was 40, whereby polymer fine particles were manufactured. The volume average particle diameter of the polymer fine particles measured by the same method as that in Manufacturing Example 1 was 4.7 μm, and the CV value was 24%.

Manufacturing Example 19

The same procedure as in Manufacturing Example 6 was repeated except that the concentration of the aqueous solution of the dispersing agent (PVA217, product of KURARAY Co., Ltd.) was increased from 3 percent by mass to 5 percent by mass and that the number of the units in the casing was 10, whereby polymer fine particles were manufactured. The volume average particle diameter of the polymer fine particles measured by the same method as that in Manufacturing Example 1 was 8.1 μm, and the CV value was 48%.

Manufacturing Example 20

The same procedure as in Manufacturing Example 6 was repeated except that the concentration of the aqueous solution of the dispersing agent (PVA217, product of KURARAY Co., Ltd.) was increased from 3 percent by mass to 5 percent by mass and that the number of the units in the casing was 20, whereby polymer fine particles were manufactured. The volume average particle diameter of the polymer fine particles measured by the same method as that in Manufacturing Example 1 was 4.8 μm, and the CV value was 37%.

Manufacturing Example 21

The same procedure as in Manufacturing Example 6 was repeated except that the concentration of the aqueous solution of the dispersing agent (PVA217, product of KURARAY Co., Ltd.) was increased from 3 percent by mass to 5 percent by mass and that the number of the units in the casing was 30, whereby polymer fine particles were manufactured. The volume average particle diameter of the polymer fine particles measured by the same method as that in Manufacturing Example 1 was 3.9 μm, and the CV value was 29%.

Manufacturing Example 22

The same procedure as in Manufacturing Example 6 was repeated except that the concentration of the aqueous solution of the dispersing agent (PVA217, product of KURARAY Co., Ltd.) was increased from 3 percent by mass to 5 percent by mass and that the number of the units in the casing was 40, whereby polymer fine particles were manufactured. The volume average particle diameter of the polymer fine particles measured by the same method as that in Manufacturing Example 1 was 3.5 μm, and the CV value was 26%.

The volume average particle diameters and CV values of the polymer fine particles obtained in Manufacturing Examples 6 to 13 and Manufacturing Examples 15 to 22 are summarized in Table 1. In Table 1, the left side columns of the "Manufacturing Example No." row correspond to the results for the dispersing agent (PVA) in a concentration of 3%, and the right side columns correspond to the results for the dispersing agent (PVA) in a concentration of 5%.

TABLE 1

| | | Dispersing agent: PVA Concentration 3% | | Dispersing agent: PVA Concentration 5% | |
|---|---|---|---|---|---|
| Manufacturing Example No. | Number of units Stacks | Volume average particle diameter μm | CV Value % | Volume average particle diameter μm | CV Value % |
| Manufacturing Example 15/ Manufacturing Example 19 | 10 | 9.4 | 51 | 8.1 | 48 |
| Manufacturing Example 16/ Manufacturing Example 20 | 20 | 5.9 | 31 | 4.8 | 37 |

TABLE 1-continued

| Manufacturing Example No. | Number of units Stacks | Dispersing agent: PVA Concentration 3% | | Dispersing agent: PVA Concentration 5% | |
|---|---|---|---|---|---|
| | | Volume average particle diameter μm | CV Value % | Volume average particle diameter μm | CV Value % |
| Manufacturing Example 17/ Manufacturing Example 21 | 30 | 5.1 | 24 | 3.9 | 29 |
| Manufacturing Example 18/ Manufacturing Example 22 | 40 | 4.7 | 24 | 3.5 | 26 |
| Manufacturing Example 6/ Manufacturing Example 10 | 50 | 4.6 | 22 | 3.2 | 25 |
| Manufacturing Example 7/ Manufacturing Example 11 | 100 | 4.1 | 21 | 2.9 | 22 |
| Manufacturing Example 8/ Manufacturing Example 12 | 150 | 3.8 | 21 | 2.7 | 21 |
| Manufacturing Example 9/ Manufacturing Example 13 | 200 | 3.7 | 20 | 2.5 | 20 |

The data for the Manufacturing Examples shows that when the number of units exceeds 50, the CV value is 25% or less and an emulsion dispersion having a sharp size distribution can be manufactured.

Comparative Example 1

300 Parts of naphtesol being a hydrocarbon-based solvent (product of NIPPON OIL CORPORATION) and 600 parts of an aqueous solution of a dispersing agent (1 percent by mass of PVA205, product of KURARAY Co., Ltd.) were emulsified and dispersed using a TK homomixer (product of Tokushu Kika Kogyo) until the volume average particle diameter of the dispersed phase reached 20 μm. The CV value at that point was 42%.

Comparative Example 2

The same procedure as in Comparative Example 1 was repeated except that the raw materials for emulsification were changed to 300 parts of SAS296 (product of NIPPON OIL CORPORATION) containing 5 percent by mass of crystal violet lactone dissolved therein and 600 parts of an aqueous solution of a dispersing agent (5 wt % of Micron8020, Nissho Kogyo Co., Ltd.), and emulsification and dispersion were preformed until the liquid droplets of the dispersed phase reached 10 μm. The same treatment as in Manufacturing Example 5 was repeated to encapsulate the obtained emulsion and evaluate the capsules. The volume average particle diameter of the capsules was 10 μm, and the CV value was 42%. Coloring was found in the evaluation results using commercial CF paper. The cause of the coloring may be the breakage of capsules having large diameters present in the capsule slurry.

Comparative Example 3

The same procedure as in Comparative Example 1 was repeated except that the raw materials for emulsification were changed to 300 parts of methyl methacrylate (MMA) containing 1 percent by mass of benzoyl peroxide dissolved therein and 600 parts of an aqueous solution of a dispersing agent (1 percent by mass, PVA205, product of KURARAY Co., Ltd.) to perform emulsification and dispersion. Then the method of Example 6 was used to polymerize the MMA in the emulsion to obtain MMA polymer particles. The volume average particle diameter of the MMA polymer particles was 9 μm, and the CV value was 58%.

INDUSTRIAL APPLICABILITY

The liquid droplets in an emulsion obtained by the method and apparatus of the present invention have a controlled particle diameter distribution, in particular, a uniform distribution which is narrower than those of conventional products. Therefore, the emulsion can be suitably used as products such as cosmetics, foods, paints, paper products, films, and recording materials and as raw materials and products in industrial areas relating to these products. When the emulsion is used in cosmetics, excellent spreadability on the skin can be obtained, and the stability of the products is also good.

Microcapsules and polymer particles obtained using the emulsion have a controlled particle diameter distribution, in particular, a uniform distribution which is narrower than those of conventional products. Therefore, the microcapsules are suitably used as information recording materials, such as toners for copying machines and printers, which utilize the pressure sensitivity, thermo-sensitivity, and photo-sensitivity of the microcapsules. The microcapsules are also suitably used as display materials such as electronic paper and as pharmaceuticals, agricultural chemicals, insecticides, aromatics, thermal storage materials, and the like. The polymer fine particles obtained using the emulsion can be suitably used as: anti-blocking agents for plastic films; optical materials used to impart light-diffusion and reflection prevention functions and used for spacer applications; paints and inks used to mat or color construction materials or the interior parts of automobiles, to improve the texture thereof, or to impart other functions; cosmetic materials used to impart smoothness to foundations and the like; additives used to improve thermal resistance and solvent resistance of resins and to impart various properties, such as low shrink property, thereto; and diagnostic reagents and fine particle preparations used in the medical field.

The microcapsules and polymer fine particles are also used for other applications such as pigments, dyes, conductive components, thermal recording paper, reinforcing materials for resins, additives in fats and oils, artificial stones, and chromatography.

The invention claimed is:

1. A method for controlling a particle diameter and a particle diameter distribution of a plurality of emulsion particles during manufacturing of an emulsion dispersion, the method comprising causing two or more types of liquids substantially immiscible with each other to successively and continuously pass through a plurality of net bodies to thereby control the particle diameter and the particle diameter distribution of the emulsion particles, each of the net bodies being in contact with a spacer such that the net bodies are disposed in a cylindrical flow passage at intervals of between 5 and 200 mm to maintain stabilization of the emulsion particles, the number of the net bodies being between 50 and 200, each of the net bodies being equivalent to a gauze having a mesh number of 35 mesh to 4000 mesh in accordance with an ASTM standard, and each of the net bodies having a surface crossing a direction of the flow passage, wherein a plurality of feed pumps are provided for the respective two or more types of liquids to separately feed the liquids through the plurality of net bodies.

2. The method according to claim 1, wherein the net bodies have a multilayer structure.

3. An emulsification apparatus comprising: a feed pump for feeding two or more types of liquids substantially immiscible with each other; a cylindrical flow passage having a first end from which the two or more types of liquids fed by the feed pump are introduced and a second end to which the two or more types of liquids passing through the cylindrical flow passage are directed; a plurality of net bodies disposed in the cylindrical flow passage, each of the net bodies being in contact with a spacer such that the net bodies are disposed at a plurality of intervals of between 5 and 200 mm, the number of the net bodies being between 50 and 200, each of the net bodies being equivalent to a gauze having a mesh number of 35 mesh to 4000 mesh in accordance with an ASTM standard, each of the net bodies having a surface that intersects a direction of the flow passage, wherein the liquids pass sequentially through the net bodies and are thereby emulsified forming a plurality of emulsion particles, the intervals between the net bodies being selected based on maintaining stabilization of the emulsion particles in the liquids passing sequentially through the net bodies, wherein the feed pump comprises a plurality of feed pumps for the respective two or more types of liquids to separately feed the liquids through the plurality of net bodies.

4. The emulsification apparatus according to claim 3, wherein the net bodies have a multilayer structure.

5. The emulsification apparatus according to claim 3, wherein the net bodies are composed of gauzes.

6. The method of claim 1, wherein the net bodies and the spacers are the only obstacles in the cylindrical flow path between a first net body and a last net body.

7. The apparatus of claim 3, wherein the net bodies and the spacers are the only obstacles in the cylindrical flow path between a first net body and a last net body.

* * * * *